UNITED STATES PATENT OFFICE.

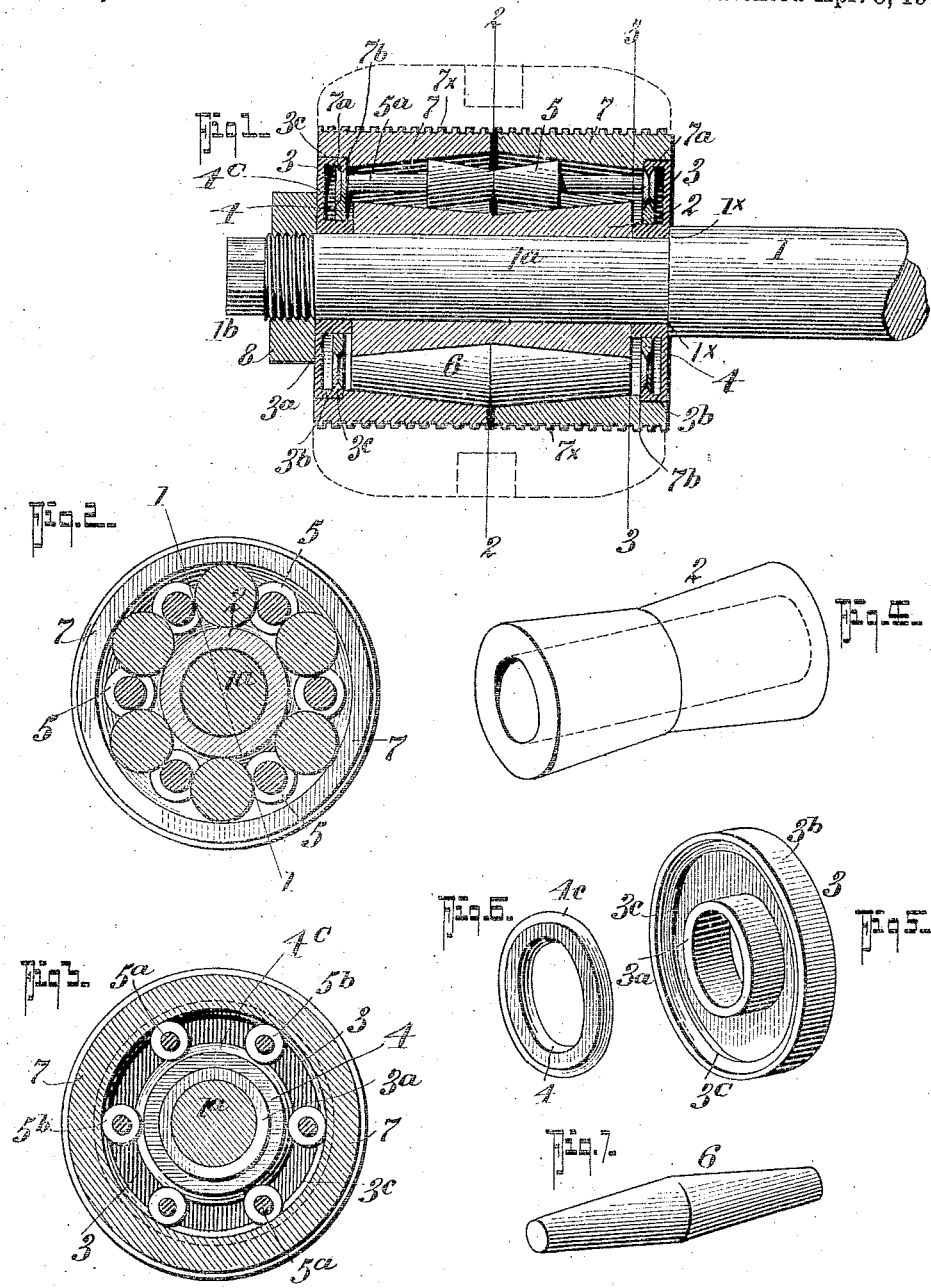

PETER MASSMAN, OF SAN DIEGO, CALIFORNIA, ASSIGNOR OF ONE-HALF TO IRA J. KUERT, OF SAN DIEGO, CALIFORNIA.

ROLLER-BEARING.

953,789.   Specification of Letters Patent.   Patented Apr. 5, 1910.

Application filed March 17, 1908. Serial No. 421,694.

*To all whom it may concern:*

Be it known that I, PETER MASSMAN, residing at San Diego, in the county of San Diego and State of California, have invented certain new and useful Improvements in Roller-Bearings, of which the following is a specification.

My invention relates to certain new and useful improvements in roller bearings of the anti-frictionally spaced circular series type, and it primarily has for its object to provide a bearing as nearly frictionless as possible, while at the same time producing a bearing of a simple and effective construction which can be easily and cheaply manufactured and which will readily serve its intended purposes.

Again my invention has for its object to provide a bearing in which the parts are interchangeable and may be replaced when conditions require.

Generically my invention embodies a bearing sleeve removably held on the axle between two roller retainers, double cone bearing rollers serially arranged around the sleeve with their axes parallel to that of the sleeve, a bearing roller sleeve surrounding the rollers and adapted to be held to the rollers to turn therewith, together with spacing cone rollers having shafts terminating in grooved rollers that are held in runways formed between the roller retainer and a coöperating ring held thereon.

My invention also includes those specific constructions, combinations and arrangements of parts which will be hereinafter fully described, specifically pointed out in the appended claims, and illustrated in the accompanying drawings; in which:

Figure 1, is a central section of my invention taken on the line 1—1 of Fig. 2. Fig. 2, is a cross section on the line 2—2 of Fig. 1. Fig. 3, is a cross section on the line 3—3 of Fig. 1. Fig. 4, is a detail perspective view of the shaft sleeve. Fig. 5, is a similar view of the roller retainer. Fig. 6, is a detail perspective view of the ring that coöperates with the retainer. Fig. 7, is a perspective view of one of the bearing rollers. Fig. 8, is a similar view of one of the spacing rollers.

Referring now to the accompanying drawings in which like letters and numerals of reference indicate like parts in all of the figures, 1 designates the shaft which is provided with the spindle $1^a$ and the threaded cap receiving portion $1^b$.

2 represents the shaft sleeve which is removably held on the shaft and is of double cone shape with the apex portions of the cone surfaces adjacent to one another.

The shaft 1, where it joins its spindle portion $1^a$, is formed with a shoulder $1^x$ to form a stop for the roller retainer 3, which has a hub portion $3^a$ apertured to fit on the spindle $1^a$ and is provided with a peripheral portion $3^b$ having an internal V-shaped track $3^c$ to act in connection with the track $4^c$ of the ring 4 to retain the grooved rollers $5^b$ of the spacing rollers 5 between the same, and form a runway therefor. The ring 4 is apertured to fit on the sleeve portion $3^a$ of the retainer 3 and aline with the track $3^c$ thereof. A roller retainer 3 and a ring 4 are mounted at each end of the sleeve 2. The spacing rollers 5 are of similar form in side elevation to the sleeve 2, namely, are formed of double truncated cone sections with their portions of least diameter abutting one another and the spacing rollers 5 are formed with shafts $5^a$ that terminate in the rollers $5^b$.

6 represents the bearing rollers which are formed of double truncated conical sections with their portions of greatest diameter abutting one another, as clearly indicated in Fig. 1 of the drawings. The bearing rollers 6 lie between the sleeve 2 on the spindle $1^a$ and the sleeves 7 which form the hub lining, the sleeves 7 being formed with countersunk portions $7^a$ forming shoulders $7^b$ to receive the roller retainers 3, as clearly shown in Fig. 1 of the drawings, and thus act as dust guards to prevent dust and dirt entering into the bearings. Each hub sleeve 7 is of like form and has its roller engaging surface formed of a truncated cone shape with its portion of greatest diameter at the central or inner end and its portion of least diameter adjacent to the countersunk portion $7^a$ thereof.

The outer surface of the sleeve 7 may be provided with threads $7^x$ whereby they may be screwed into the hub. The rollers $5^b$ may run loosely on the shafts $5^a$ if desired to aid in assembling the parts. A nut 8 may be secured onto the thread portion $1^b$ of the spindle $1^a$ to hold the outer retainer 3 in place, and thus maintain the assemblage of parts.

In assembling the parts the member 3 is first slid on the shafts and the rollers 5ᵇ at one end of the shafts 5ᵃ are placed with their grooves in the member 3 and one member 7 is placed into position, after which the rollers 6 are placed into position. The other member 3 with the member 4 thereon and the rollers 5ᵇ which are loose or detachable from the shafts 5ᵃ are then slid onto the end of the spindle with the other member 7, thus completing the assembling of the parts.

From the foregoing description taken in connection with the accompanying drawings, it is thought the complete construction, operation and advantages of my invention will be readily understood by those skilled in the art to which the invention appertains.

The hub sleeves 7 may be made a slight distance apart so that in case of wear on the bearings the same may be taken up by screwing the two sections of the sleeves 7 toward one another.

What I claim is:

1. In a roller bearing, a shaft sleeve having a peripheral bearing surface, a hub sleeve having an internal bearing surface to coöperate with that of the shaft sleeve, interposed bearing rollers between the bearing surfaces of the shaft and hub sleeves, spacing rollers between said bearing sleeves, said spacing rollers having shafts, and grooved wheels mounted on said shafts on the ends thereof combined with roller retainers having runways for said grooved wheels, said hub sleeve having countersunk portions to receive said retainers and form therewith a closure for the bearing rollers.

2. In a roller bearing, the combination with a spindle, of roller retainers removably mounted on said spindle and spaced apart, a shaft sleeve mounted on said spindle between said roller retainers, said shaft sleeve having a double cone peripheral bearing surface, a hub sleeve having an internal bearing surface, combined with a series of double cone bearing rollers interposed between the bearing surfaces of the hub and shaft sleeves and spacing rollers carried by said roller retainers.

3. In a roller bearing, the combination with a spindle, of roller retainers removably mounted on said spindle and spaced apart, a shaft sleeve mounted on said spindle between said roller retainers, said shaft sleeve having a double cone peripheral bearing surface, a hub sleeve having an internal bearing surface, a series of double cone bearing rollers interposed between the bearing surfaces of the hub and shaft sleeves, said hub sleeves having countersunk portions to receive said roller retainers to form a closure for the bearings, said roller retainers having internal trackways and spacing rollers interposed between adjacent bearing rollers and having shafts terminating in grooved wheels to coöperate with said trackways of said roller retainers.

4. In a roller bearing, the combination with a spindle, of roller retainers removably mounted on said spindle and spaced apart, a shaft sleeve mounted on said spindle between said roller retainers, said shaft sleeve having a double cone peripheral bearing surface, a hub sleeve having an internal bearing surface, a series of double cone bearing rollers interposed between the bearing surfaces of the hub and shaft sleeves, said hub sleeves having countersunk portions to receive said roller retainers to form a closure for the bearings, said roller retainers having internal trackways, spacing rollers interposed between adjacent bearing rollers and having shafts terminating in grooved wheels to coöperate with said trackways of said roller retainers, and rings carried by said roller retainers and provided with peripheral tracks to coöperate with the roller retainer track.

5. In a roller bearing, a pair of spaced roller retainers having hub portions to receive a shaft spindle, a shaft sleeve interposed between said roller retainers and provided with a peripheral doubly coned bearing surface, double cone shaped bearing rollers serially arranged around said sleeve to coöperate therewith, a pair of hub sleeves surrounding said bearing rollers, said hub sleeves having countersunk portions to receive said roller retainers and form closures therewith, double cone shaped spacing rollers interposed between said bearing rollers, having means mounted within the roller retainers to retain and guide the spacing rollers.

6. In a roller bearing, a pair of spaced roller retainers, having hub portions to receive a shaft spindle, a shaft sleeve interposed between said roller retainers and provided with a peripheral doubly coned bearing surface, double cone shaped bearing rollers serially arranged around said sleeve to coöperate therewith, a pair of hub sleeves surrounding said bearing rollers, said hub sleeves having countersunk portions to receive said roller retainers and form closures therewith, double cone shaped spacing rollers interposed between said bearing rollers, said spacing rollers having means mounted within the roller retainers to retain and guide the rollers, said last named means comprising shafts projecting from said retaining rollers, grooved wheels mounted on the ends of said shafts, said roller retainers having an internal track to coöperate with said last named wheels.

7. In a roller bearing, a pair of spaced roller retainers having hub portions to receive a shaft spindle, a shaft sleeve interposed between said roller retainers and provided with a peripheral doubly coned bearing surface, double cone shaped bearing rollers serially arranged around said sleeve to coöperate therewith, a pair of hub sleeves surrounding said bearing rollers, said hub sleeves having countersunk portions to receive said roller retainers and form closures therewith, double cone shaped spacing rollers interposed between said bearing rollers, said spacing rollers having means mounted within the roller retainers for retaining the spacing rollers, said last named means comprising shafts projecting from said retaining rollers, grooved wheels mounted on the ends of said shafts, said roller retainers having an internal track to coöperate with said last named wheels, together with a ring carried by said roller retainers and provided with a peripheral track to coöperate with the first mentioned track to form a runway for said last mentioned rollers.

PETER MASSMAN.

Witnesses:
H. E. DOOLITTLE,
WM. L. MORRISON.